(12) United States Patent
Feingold et al.

(10) Patent No.: US 12,439,001 B2
(45) Date of Patent: Oct. 7, 2025

(54) SYSTEMS AND METHODS FOR EFFICIENT TRANSMISSION OF IMAGING METADATA

(71) Applicant: Stryker Corporation, Kalamazoo, MI (US)

(72) Inventors: Benjamin Hyman Feingold, San Francisco, CA (US); Brandon B. Hunter, Hollister, CA (US)

(73) Assignee: Stryker Corporation, Portage, MI (US)

( * ) Notice: Subject to any disclaimer, the term of this patent is extended or adjusted under 35 U.S.C. 154(b) by 296 days.

(21) Appl. No.: 18/147,679

(22) Filed: Dec. 28, 2022

(65) Prior Publication Data

US 2023/0209012 A1    Jun. 29, 2023

Related U.S. Application Data

(60) Provisional application No. 63/294,822, filed on Dec. 29, 2021.

(51) Int. Cl.
*H04N 7/08*        (2006.01)

(52) U.S. Cl.
CPC ..................... *H04N 7/08* (2013.01)

(58) Field of Classification Search
CPC ...... H04N 7/08; H04N 21/233; H04N 21/235; H04N 21/23602; H04N 21/434; H04N 21/4342; H04N 21/435; H04N 21/4363; H04N 21/8126; H04N 21/84; H04N 21/43635; G09G 2370/12
USPC ........................................................ 348/207.1
See application file for complete search history.

(56) References Cited

U.S. PATENT DOCUMENTS

| | | | |
|---|---|---|---|
| 9,773,469 B2 * | 9/2017 | Ju | G09G 5/005 |
| 2002/0164149 A1 | 11/2002 | Wilkinson | |
| 2012/0183276 A1 | 7/2012 | Quan et al. | |
| 2012/0281960 A1 * | 11/2012 | Boncha | H04N 5/772 |
| | | | 386/E5.002 |

(Continued)

FOREIGN PATENT DOCUMENTS

WO    2015/050857 A1    4/2015

OTHER PUBLICATIONS

Hightower. "Use of KLV to combine metadata, camera sync, and data acquisition into a single video record," Proceedings of SPIE, IEEE, May 19, 2015, USA: pp. 94630K-1-94630K-8.

(Continued)

*Primary Examiner* — Usman A Khan
(74) *Attorney, Agent, or Firm* — Morrison & Foerster LLP

(57) ABSTRACT

A system for transmission of imaging metadata comprises a sensor configured to capture audiovisual data and a data transmission device. The data transmission device receives captured audiovisual data from the first sensor and receives metadata, wherein the metadata is metadata of a first type. The data transmission device generates a data structure corresponding to a first frame of a video feed, wherein the data structure is generated in accordance with a predefined data specification, wherein generating the data structure comprises setting an indicator in the data structure to indicate that a second type of metadata should not be read from a first field in the data structure and writing the first metadata to the first field in the data structure. The data transmission device transmits the data structure along with the captured audiovisual data.

18 Claims, 11 Drawing Sheets

(56) References Cited

U.S. PATENT DOCUMENTS

| | | | |
|---|---|---|---|
| 2013/0265449 A1* | 10/2013 | Yoneda | H04N 23/661 348/207.1 |
| 2016/0241829 A1* | 8/2016 | Qu | G09G 5/10 |
| 2016/0373823 A1* | 12/2016 | Perez | H04N 21/84 |
| 2020/0349674 A1* | 11/2020 | Ramanujam | G06N 5/025 |
| 2021/0360236 A1 | 11/2021 | Kirk et al. | |

OTHER PUBLICATIONS

International Preliminary Report on Patentability mailed Jul. 11, 2024, directed to International Application No. PCT/US2022/082490; 15 pages.

International Search Report and Written Opinion mailed May 8, 2023, directed to International Application No. PCT/US2022/082490; 24 pages.

Korenblum et al. (Aug. 1, 2011) "Managing biomedical image metadata for search and retrieval of similar images," Journal of Digital Imaging 24(4):739-748.

Virginie Drugeon Panasonic Business Support Europe GMBH. (Dec. 2020) "TM5874_TM-AVC1206_CTA_Liaison_to_DVB," located at https://member.dvb.org/wg/TM-AVC/documentRevision/download/45178TM5874_TM-AVC1206_CTA_Liaison_to_DVB.zipCTA-861-H-Final. pdf. (280 pages).

Wikipedia. (Jun. 1, 2015) "Exif," located at https://en.wikipedia.org/w/index.php?title=Exif&oldid=664942639. (10 pages).

* cited by examiner

| | 7 | 6 | 5 | 4 | 3 | 2 | 1 | 0 |
|---|---|---|---|---|---|---|---|---|
| InfoFrame Type | | | | Type = 02 | | | | |
| InfoFrame Version | | | | Version = 02 | | | | |
| InfoFrame Length | | | | Length = 13 | | | | |
| Data Byte 1 | 0 | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | 0 | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | Line Number of End of Top Bar (lower 8 bits) | | | | | | | |
| Data Byte 7 | Line Number of End of Top Bar (upper 8 bits) | | | | | | | |
| Data Byte 8 | Line Number of End of Bottom Bar (lower 8 bits) | | | | | | | |
| Data Byte 9 | Line Number of End of Bottom Bar (upper 8 bits) | | | | | | | |
| Data Byte 10 | Line Number of End of Left Bar (lower 8 bits) | | | | | | | |
| Data Byte 11 | Line Number of End of Left Bar (upper 8 bits) | | | | | | | |
| Data Byte 12 | Line Number of End of Right Bar (lower 8 bits) | | | | | | | |
| Data Byte 13 | Line Number of End of Right Bar (upper 8 bits) | | | | | | | |

FIG. 2

SYSTEMS AND METHODS FOR EFFICIENT TRANSMISSION OF IMAGING METADATA

CROSS-REFERENCE TO RELATED APPLICATIONS

This application claims the benefit of U.S. Provisional Application No. 63/294,822, filed Dec. 29, 2021, the entire contents of which are hereby incorporated by reference herein.

FIELD

This disclosure relates generally to imaging metadata transmission, and more particularly to transmission of frame-aligned surgical imaging metadata.

BACKGROUND

The field of surgical visualization includes imaging techniques that are used by medical practitioners during diagnosis, surgery, and/or post-surgical evaluation. These techniques allow, for example, real-time and high-precision guidance of a surgeon's instrument during an operation, optical feedback during endoscopy, and visualization of fluorescent dye added to contrast anatomical structures. As such, procedures including automated image sensor alignment, image stabilization, and fluorescence quantification and normalization form important surgical image processing techniques.

Use of these processing techniques may require that a system can accurately and reliably associate each frame of a surgical video feed with image sensor metadata for that frame. Additionally, applications involving machine learning and other post-processing procedures may require a reliable and accurate association between metadata and video frame. Image sensor metadata can include data indicating, for example, image sensor type, image sensor configuration, analog and/or digital gain, exposure duration, orientation, rotation, and/or acceleration. According to known methods for associating image sensor metadata with audiovisual data (which may refer to image data and/or audio data), the metadata and audiovisual data are each transmitted separately from an image sensor to a processing device, and the processing device then applies one or more frame-alignment operations, after transmission, to frame-align the audiovisual data and the metadata.

SUMMARY

As explained above, existing techniques for providing audiovisual data with frame-aligned metadata require post-transmission frame-alignment of separately-transmitted audiovisual data and metadata. For example, while image sensor metadata and audiovisual data may be collected simultaneously, the audiovisual data and metadata may then be transmitted separately. When metadata is transmitted on a separate channel from audiovisual data, for example, a difference in delay between the two channels may require temporal calibration to produce alignment of metadata with video frame, thereby reducing efficiency and reliability, and preventing rapid "real-time" utilization of the transmitted data. Thus, known techniques do not provide for rapid and efficient use of audiovisual data with frame-aligned metadata, preventing real-time video-processing applications that require frame-aligned audiovisual data with metadata to be received and leveraged rapidly.

In light of these challenges, a need exists for systems and methods that improve the efficiency and reliability of metadata frame alignment with surgical imaging data (which may include image data and/or audio data).

Disclosed herein are systems and methods for rapid and efficient transmission of imaging metadata along with audiovisual data, wherein the metadata and audiovisual data are transmitted in a frame-aligned manner, thereby addressing one or more of the above-identified needs. As described herein, the metadata that is transmitted along with the audiovisual data may include auxiliary image processing data, sensor data, and/or image processing parameters (additional digital gain, gamma curves, pedestal levels, white balance offsets, tone mapping, etc.) applied after receipt from the sensor but before transmission. The systems disclosed herein may include a surgical image sensor, a data transmission device, and a data receipt device. The surgical image sensor and the data transmission device may be provided as a single device or may be provided as separate devices. The data transmission device may generate one or more data structures corresponding to a specific video frame for transmission to the data receipt device, and/or may write data to one or more fields to be transmitted to the data receipt device in accordance with one or more data transport protocols. In addition to audiovisual data corresponding to a specific frame and received from the image sensor, the transmission may also include surgical imaging metadata corresponding to the same specific frame. Optionally, said metadata may be included in a data structure that is wholly or partially compliant with a predefined data specification (e.g., specifying a data structure for an InfoFrame, such as an AVI InfoFrame, an Audio InfoFrame, and/or an MPEG Source InfoFrame of the HDMI specification) (e.g., by writing to fields of an InfoFrame usually used for transmission of different types of metadata than the metadata being transmitted according to the methods disclosed herein); may be encoded into one or more fields of a video-channel (e.g., fields usually used for conveying pixel color data); and/or may be encoded into one or more fields of an audio channel. Upon receipt of the data comprising the audiovisual data and metadata in a transmission for a single frame of a video feed, the data receipt device may read said data and treat said data in a frame-aligned manner, for example by applying one or more data processing operations that leverage the audiovisual data and the metadata for the frame.

A predefined and standardized data specification and/or data transport protocol/standard may be used to define all or part of the form of the data transmitted. As explained herein, a modified version of a standardized data specification (e.g., specifying an InfoFrame data structure) may be used. As explained herein, a modified version of a standardized data transport protocol (e.g., the HDMI Specification) may be used. Metadata—for example including data indicating sensor parameters such as gain, exposure, and/or inertial motion data—may optionally be stored in a standardized data structure by, for example, being stored in said data structure in a location that would be used, according to a standard data specification, to store video format data distinct from the metadata. Metadata may also be optionally stored for transmission as part of the video frame and/or over an audio channel associated with the predefined transport protocol. By optionally transmitting metadata together with audiovisual data, for example by transmitting it as part of a standardized data structure pertaining to a video frame, metadata and imaging data may be transmitted together in a frame-aligned manner without the need for a separate communication channel and associated processing, thereby increasing efficiency.

The data transmission device may be configured to transmit the audiovisual data and the metadata, according to a predefined data transport protocol, to a data reception device. The data reception device may read the audiovisual data and/or metadata and apply one or more surgical image processing techniques, based on the received audiovisual data and the received frame-aligned metadata. The image processing techniques may include, for example, sensor alignment, image stabilization, machine learning applications, and/or conversion of audiovisual data and/or metadata to a different storage format, with the frame-aligned metadata optionally informing each of these processing techniques. By transmitting the audiovisual data along with frame-aligned metadata in the rapid and efficient manner described herein, rapid and efficient real-time video processing techniques are enabled.

In some aspects, a system for transmission of imaging metadata is provided, the system comprising: a first sensor configured to capture audiovisual data; a data transmission device comprising one or more processors configured to cause the data transmission device to: receive the captured audiovisual data from the first sensor; receive first metadata, wherein the first metadata is metadata of a first type; generate a data structure corresponding to a first frame of a video feed, wherein the data structure is generated in accordance with a predefined data specification, wherein generating the data structure comprises: setting an indicator in the data structure to indicate that a second type of metadata should not be read from a first field in the data structure; and writing the first metadata to the first field in the data structure; and transmit the data structure along with the captured audiovisual data.

Optionally, the first metadata comprises information characterizing one or more of: an orientation of a component of the system, an acceleration of a component of the system, a rotation of a component of the system, a gain of the first sensor, a shutter characteristic of a component of the system, and an environmental characteristic of an environment in which the system is disposed.

Optionally, the data structure comprises an InfoFrame data structure defined by the predefined data specification, the InfoFrame data structure including the indicator and the first field.

Optionally, setting the indicator comprises setting a predefined bit to a predetermined value.

Optionally, the first field is configured, according to the predefined data specification, to store second type of metadata when the indicator is set to indicate that the second type of metadata should be read from the first field.

Optionally, the first field is configured, according to the predefined data specification, to store one or more of pixel information and line information when the indicator is set to indicate that the second type of metadata should be read from the first field.

Optionally, the first field is configured, according to the predefined data specification, to store bar location information when the indicator is set to indicate that the second type of metadata should be read from the first field.

Optionally, the system comprises: a second sensor configured to capture the first metadata before the system writes the first metadata to the data structure; wherein the one or more processors are configured to cause the data transmission device to receive the first metadata from the second sensor before writing the first metadata to the data structure.

Optionally, the second sensor comprises an orientation sensor; and the first metadata comprises orientation data representing an orientation of the first sensor at a time at which the first sensor captured the audiovisual data.

Optionally, the second sensor comprises an inertial motion sensor; and the first metadata comprises inertial motion data representing an inertial motion characteristic of the first sensor at a time at which the first sensor captured the audiovisual data.

Optionally, the first sensor and the second sensor are each configured to capture data at a same capture rate.

Optionally, the first sensor and the second sensor are each configured to transmit captured data to the data transmission device in accordance with a same data transport protocol.

Optionally, the first sensor and the second sensor are configured to capture data at different capture rates; and the one or more processors are configured to cause the data transmission device to sample data from the first sensor and the second sensor at a same sample rate.

Optionally, the system comprises a data reception device comprising a second set of one or more processors configured to cause the data reception device to: receive the transmitted data structure; receive the transmitted audiovisual data; read, from the transmitted data structure, the first metadata that was written to the first field of the data structure; and apply one or more data processing techniques to the transmitted audiovisual data, wherein the one or more data processing techniques are applied in accordance with the first metadata read from the first field of the transmitted data structure.

Optionally, the system comprises a data reception device comprising a second set of one or more processors configured to cause the data reception device to: receive the transmitted data structure; receive the transmitted audiovisual data; read, from the transmitted data structure, the first metadata that was written to the first field of the data structure; and store the audiovisual data and the first metadata in a frame-aligned manner in a second data structure, distinct from the first data structure.

Optionally, the system comprises a data reception device comprising a second set of one or more processors configured to cause the data reception device to: receive the transmitted data structure; receive the transmitted audiovisual data; read, from the transmitted data structure, the first metadata that was written to the first field of the data structure; and apply one or more machine-learning techniques to the audiovisual data and the metadata read from the first field of the transmitted data structure.

In some aspects, a method for transmission of imaging metadata is provided, the method performed by a system comprising a first sensor configured to capture audiovisual data and a data transmission device comprising one or more processors, the method comprising: receiving the captured audiovisual data from the first sensor; receiving first metadata, wherein the first metadata is metadata of a first type; generating a data structure corresponding to a first frame of a video feed, wherein the data structure is generated in accordance with a predefined data specification, wherein generating the data structure comprises: setting an indicator in the data structure to indicate that a second type of metadata should not be read from a first field in the data structure; and writing the first metadata to the first field in the data structure; and transmitting the data structure along with the captured audiovisual data.

In some aspects, a non-transitory computer-readable storage medium storing instructions for transmission of imaging metadata is provided, the instructions configured to be executed by one or more processors of a system comprising a first sensor configured to capture audiovisual data and a data transmission device. Alternatively, or additionally, a computer program product is provided including instructions configured to be executed by one or more processors of a system comprising a first sensor configured to capture audiovisual data and a data transmission device. Execution of the instructions by the one or more processors causes the data transmission device to: receive the captured audiovisual data from the first sensor; receive first metadata, wherein the first metadata is metadata of a first type; generate a data structure corresponding to a first frame of a video feed, wherein the data structure is generated in accordance with a predefined data specification, wherein generating the data structure comprises: setting an indicator in the data structure to indicate that a second type of metadata should not be read from a first field in the data structure; and writing the first metadata to the first field in the data structure; and transmit the data structure along with the captured audiovisual data.

In some aspects, a system for transmission of imaging metadata is provided, comprising: a first sensor configured to capture audiovisual data; a data transmission device comprising one or more processors configured to cause the data transmission device to: receive the captured audiovisual data from the first sensor; receive metadata; transmit the audiovisual data according to a predefined data transport protocol; and transmit the metadata over an audio channel in compliance with the first predefined data transport protocol.

In some aspects, a method for transmission of imaging metadata is provided, the second method performed by a system comprising a first sensor configured to capture audiovisual data and a data transmission device comprising one or more processors, the method comprising: receiving the captured audiovisual data from the first sensor; receiving metadata; transmitting the audiovisual data according to a predefined data transport protocol; and transmitting the metadata over an audio channel in compliance with the first predefined data transport protocol.

In some aspects, a non-transitory computer-readable storage medium storing instructions for transmission of imaging metadata is provided or a computer program product including instructions for transmission of imaging metadata, the instructions configured to be executed by one or more processors of a system comprising a first sensor configured to capture audiovisual data and a data transmission device, wherein execution of the instructions by the one or more processors causes the data transmission device to: receive the captured audiovisual data from the first sensor; receive metadata; transmit the audiovisual data according to a predefined data transport protocol; and transmit the metadata over an audio channel in compliance with the first predefined data transport protocol.

In some aspects, a system for transmission of imaging metadata is provided, comprising: a first sensor configured to capture video data; a data transmission device comprising one or more processors configured to cause the data transmission device to: receive the captured video data from the first sensor; receive metadata; transmit the captured video data via a first set of one or more fields of a video channel data transmission configured, according to a predefined data transport protocol, to transmit video information for one or more color channels; and transmit the metadata via a second set of one or more fields of the video channel data transmission configured, according to the predefined data transport protocol, to transmit video information for one or more color channels.

Optionally, the second set of one or more fields is configured, according to the predefined data transport protocol, to indicate video information for a first subset of pixels of the first frame.

Optionally, the subset of pixels of the first frame comprises a contiguous subset of one or more lines of the first frame.

Optionally, the subset of pixels of the first frame comprises a plurality of pixel patches that are separated from one another by one or more sets of buffer pixels.

Optionally, the first set of one or more fields is configured, according to the predefined data transport protocol, to indicate video information for a second subset of pixels of the first frame.

Optionally, the first set of one or more fields is configured, according to the predefined data transport protocol, to indicate video information for a first set of one or more colors for a first frame; the second set of one or more fields is configured, according to the predefined data transport protocol, to indicate video information for a second set of one or more colors for the first frame.

Optionally, transmitting the captured video data and transmitting the metadata comprises: transmitting the captured video data for a first frame via the first set of one or more fields, wherein the first set of one or more fields is configured, according to a predefined data transport protocol, to indicate information for the first frame; and transmitting the metadata for the first frame via the second set of one or more fields, wherein the second set of one or more fields is configured, according to the predefined data transport protocol, to indicate information for a second frame.

Optionally, transmitting the metadata comprises transmitting the metadata in key-length-value format.

In some aspects, a method for transmission of imaging metadata is provided, the method performed by a system comprising a first sensor configured to capture audiovisual data and a data transmission device comprising one or more processors, the method comprising: receiving the captured video data from the first sensor; receiving metadata; transmitting the captured video data via a first set of one or more fields of a video channel data transmission configured, according to a predefined data transport protocol, to transmit video information for one or more color channels; and transmitting the metadata via a second set of one or more fields of the video channel data transmission configured, according to the predefined data transport protocol, to transmit video information for one or more color channels.

In some aspects, a non-transitory computer-readable storage medium storing instructions for transmission of imaging metadata is provided or a computer program product including instructions for transmission of imaging metadata, the instructions configured to be executed by one or more processors of a system comprising a first sensor configured to capture audiovisual data and a data transmission device, wherein execution of the instructions by the one or more processors causes the data transmission device to: receive the captured video data from the first sensor; receive metadata; transmit the captured video data via a first set of one or more fields of a video channel data transmission configured, according to a predefined data transport protocol, to transmit video information for one or more color channels; and transmit the metadata via a second set of one or more fields of the video channel data transmission configured, according to the predefined data transport protocol, to transmit video information for one or more color channels.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

Features of the invention can be described, by way of example only, with reference to the accompanying drawings, in which:

FIG. 2 depicts a data structure containing audiovisual variables, in accordance with some aspects;

DETAILED DESCRIPTION

Figure 1:
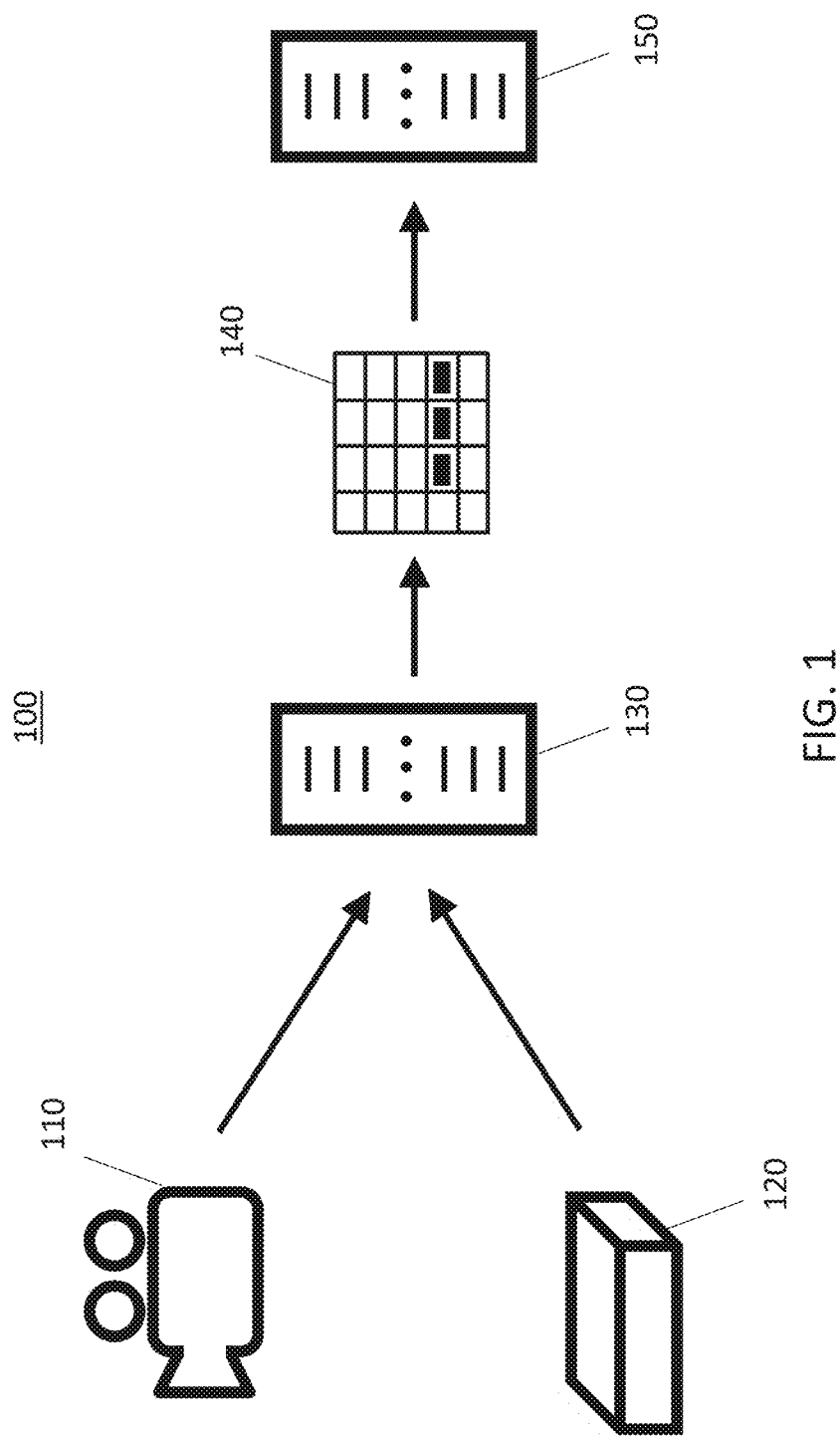
FIG. 1 depicts a system for transmission of audiovisual data and sensor metadata via a data structure corresponding to the $n^{th}$ video frame, in accordance with some aspects.

Reference will now be made in detail to implementations and aspects of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some aspects also relates to devices or systems for performing the operations herein. The devices or systems may be specially constructed for the required purposes, may comprise a general purpose computer selectively activated or reconfigured by a computer program stored in the computer, or may include any combination thereof. Computer instructions for performing the operations herein can be stored in any combination of non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. One or more instructions for performing the operations herein may be implemented in or executed by one or more Application Specific Integrated Circuits (ASICs), Field Programmable Gate Arrays (FPGAs), Digital Signal Processing units (DSPs), Graphics Processing Units (GPUs), or Central Processing Units (CPUs). Furthermore, the computers referred to herein may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Although the following examples often refer to surgical audiovisual data and metadata, it is within the scope of the invention to use the systems and methods disclosed to produce efficient frame alignment of metadata with audiovisual data in other imaging applications including, for example, vision inspection systems used for defect detection, optical character and other pattern recognition, optical gauging, as well as machine learning and other post-processing procedures associated with imaging systems.

FIG. 1 depicts a system 100 for efficient transmission of audiovisual data and associated metadata, and optionally for frame-by-frame processing of said audiovisual data and/or sensor metadata, in accordance with some aspects. As used herein, "audiovisual data" may include: image and/or video data only, audio data only, and/or any combination thereof. As used herein, image and/or video data may include data representing electromagnetic radiation of any wavelength regardless of whether it is visible to the human eye.

This system may include an audiovisual sensor 110 and a secondary sensor 120 for collecting metadata. Both the audiovisual sensor 110 and the secondary sensor 120 may be communicatively coupled (e.g., via one or more wired and/or wireless network communication protocols) with a data transmission device 130 such that they may send electronic information via network communication. Audiovisual sensor 110 and secondary sensor 120 may be provided as part of a single device (e.g., provided in or on a same housing), for example by being provided on-board a handheld device or on-board an endoscopic device. Data transmission device 130 may, optionally, be provided as part of a same device (e.g., provided in or on a same housing) as one or both of audiovisual sensor 110 and secondary sensor 120; optionally, data transmission device 130 may be provided separately from a physical device housing the sensors.

Optionally, audiovisual sensor 110 may include any one or more devices enabling the capture of medical or surgical audio and/or video, such as an audio and/or video capture device, a visible-light camera, a CCD or CMOS array, a photodiode array, a video-capture endoscope, an X-ray detector, an IR light detector, a UV light detector, and/or a microphone. The endoscope may be pre-inserted into a body lumen. The methods of transmission of imaging metadata excludes the step of inserting an endoscope in a body lumen.

Optionally, secondary sensor 120 may include any one or more devices for recording relevant metadata associated with the audiovisual sensor and/or associated with related device components. Metadata may include, for example, surgical imaging sensor parameters such as analog and/or digital gain, exposure duration, orientation, rotation, and/or acceleration, and/or ambient conditions such as light, temperature, humidity, and/or air quality. Metadata may include, for example, image processing parameters such as digital gain, gamma curves, pedestal levels, white balance offsets, tone mapping, etc. Said image processing parameters may be applied after receipt of the audiovisual data from the sensor but before transmission from transmission device 130. Secondary sensor 120 may or may not be integrated into the same housing as audiovisual sensor 110. Optionally, when secondary sensor 120 is configured to detect information regarding orientation, rotation, and/or acceleration, secondary sensor may be integrated into the same housing as audiovisual sensor 110 such that the orientation, rotation, and/or acceleration of the two sensors may be physically coupled to one another by the housing. Optionally, when secondary sensor 120 is configured to detect information regarding ambient conditions such as ambient temperature, sensor 120 may be physically uncoupled from sensor 110.

Audiovisual sensor 110 and secondary sensor 120 may be configured to transmit captured data (e.g. medical/surgical audiovisual data and/or metadata) by any wired or wireless electronic communication medium, including by any suitable network communication protocol, to data transmission device 130. Optionally, said transmission from sensor 110 and/or sensor 120 to transmission device 130 may be made at a predefined transmission rate or a predefined sampling rate. Optionally, both sensor 110 and sensor 120 may generate and/or transmit data at a same sampling/transmission rate, such that data from both sensors that arrives at transmission device 130 may be considered frame-aligned upon its arrival at the data transmission device and may be combined, upon receipt, into one or more data structures for frame-aligned transmission as described herein. (While the description herein is made with reference to metadata acquired from sensor 110 and/or sensor 120, it is understood that the metadata described herein may include metadata from other sources as well.)

Data transmission device 130 may comprise one or more processors, memory, and one or more programs stored in the memory for causing the data transmission device to provide some or all of the functionality described herein. Optionally, data transmission device 130 may be provided, in whole or in part, as all or part of a desktop computing device, laptop, tablet, mobile electronic device, dedicated medical image processing device, computing module, processor, server, cloud computing system, distributed computing system, or the like.

Data transmission device 130 may be configured to receive captured data from audiovisual sensor 110 and secondary sensor 120 (e.g. medical/surgical audiovisual data and/or metadata) and to generate, based thereon, data to be transmitted in accordance with one or more predefined data transport protocols (e.g., the HDMI Specification). This may involve generating data to be transmitted at different temporal times during the transmission (e.g., during predefined data islands), for different spatial locations of the frame (e.g., for different pixels), and for different channels of the transmission (e.g., video-channel data including data for various color-channels, and/or audio-channel data including data for audio). This may also involve generating one or more data structures that are configured, according to the predefined data transport protocol, to store certain metadata. For example, a data structure 140 associated with a particular video frame (e.g., the $n^{th}$ such frame is depicted in FIG. 1) may be generated. This data structure may then be transmitted as part of a stream of video frames during an auxiliary data island of the transmission. As described herein, while these data structures (e.g., InfoFrames) may generally be used to transmit certain kinds of metadata, they may be modified as described herein to transmit different kinds of metadata such as the sensor data described herein.

The data structure generated by data transmission device 130 may be generated in accordance with a predefined data transport protocol, for example the HDMI Specification. Data structures associated with the HDMI Specification include, for example, the AVI InfoFrame, the Audio InfoFrame, and/or the MPEG Source InfoFrame. In their usual application, such data structures include video format data, which may comprise a variety of auxiliary data items regarding the audiovisual data or a source device for said audiovisual data, wherein this information pertains to the manner in which the audiovisual data should be transported. Said video format data information may include, for example, resolution information, colorimetry information, HDR information, information regarding full-scale versus limited range, information defining a transport standard, and/or information for transport and display. According to the techniques disclosed herein, said data structures may be modified in order to include new metadata and/or additional metadata, of a different type, beyond the kinds of data that are usually included in said data structures. Said new and/or additional data that is inserted into said data structures in accordance with the disclosures made herein may include metadata indicating information about the acquisition and/or processing of said audiovisual data, rather than merely about the transport of said audiovisual data, for example, metadata from sensor 120. For example, the new and/or additional metadata may include sensor orientation data including yaw, pitch, and roll data. Optionally, data transmission device 130 modifies individual bits and/or entire bytes of data structure 140 or to write the captured metadata to fields of the data structure pertaining to a particular video frame (or to enable said writing). In other examples, metadata is optionally transmitted as part of the video frame or over an audio channel associated with the predefined data specification.

By generating data structures including metadata wherein the data structures are configured to be transmitted via one or more audiovisual channels and/or via one or more audiovisual data communication protocols, the systems described herein may ensure that audiovisual data and associated metadata are received, via transmission of the generated data structures, in a frame-aligned manner. As explained above, this assurance of temporal alignment of audiovisual data and metadata may be important for real-time surgical image processing techniques such as sensor alignment and image stabilization, as well as for post-processing procedures such as the conversion of audiovisual data and metadata to a different storage format, machine learning applications, and/or the quantification and normalization of values within a raw fluorescent image frame. Without the ability to send metadata with audiovisual data as part of the same data structure on the same channel, alternatives such as sending metadata over a separate channel (e.g., a serial channel) could introduce inefficiencies given the possibility these separate channels are associated with different signal characteristics such as delay. Producing metadata frame alignment with audiovisual data in spite of these signal characteristic differences could involve the addition of a temporal calibration process, thereby increasing system complexity and reducing efficiency.

While the disclosure herein makes reference to video frames, the techniques for "frame-alignment" described herein may also be used outside the context of video data, for example to enable efficient and rapid transmission of still-image data and temporally-associated metadata.

As depicted in FIG. 1, the system 100 may further include a data reception device 150 located downstream of data transmission device 130. The data transmission device 130 may be communicatively coupled (e.g., via one or more wired or wireless network communication interfaces) with data reception device 150 such that the data transmission device may send electronic information via network communication. Communication between data transmission device 130 and data reception device 150 may include communication via an HDMI communication interface.

Data transmission device 130 may be configured to transmit the captured audiovisual data and/or the captured metadata, for example by way of data structure 140, by any wired or wireless electronic communication medium, including by any suitable network communication protocol, to data reception device 150. Optionally, data reception device 150 may comprise one or more processors, memory, and one or more programs stored in the memory for causing the data reception device to provide some or all of the functionality described herein. Optionally, data reception device 150 may be provided, in whole or in part, as any video-receiving device including all or part of a desktop computing device, laptop, tablet, mobile electronic device, dedicated medical image processing device, computing module, processor, server, cloud computing system, distributed computing system, or the like.

Optionally, data reception device 150 may be configured to apply one or more data processing operations to the received audiovisual data and the received frame-aligned metadata. The one or more data processing operations may include, for example, real-time surgical image processing such as sensor alignment and/or image stabilization. The one or more data processing operations may include, for example, post-processing procedures such as the conversion of audiovisual data and metadata to a different storage format, machine learning applications, and/or the quantification and normalization of values within a raw fluorescent image frame.

In this way, the captured audiovisual data and the captured metadata may be processed by system 100 in a frame-by-frame manner with, optionally, real-time image processing results feeding back to the audiovisual sensor 110, the secondary sensor 120, and/or peripheral control devices connected to each.

FIG. 2 depicts a data structure 200 containing variables describing video data, in accordance with some aspects. (While FIG. 2 sets forth an example of a data structure containing variables describing video data, other data structures, including InfoFrame data structures other than an AVI InfoFrame, may be used in the techniques described herein.) This data structure may take the form of an AVI InfoFrame, which may be sent once per video frame as part of the auxiliary data of the HDMI Specification and may include variables describing the transmitted video data. AVI InfoFrame variables may include, as depicted in FIG. 2:

InfoFrame type,

InfoFrame version,

InfoFrame length (e.g., number of bytes contained within the data structure),

Information about various video control variables, indicated by bits of bytes 1-5, and Information about the size of masking bars (e.g., sets of pixels at the edges of a display left intentionally blank to create a border), indicated by bytes 6-13.

As explained herein, the bytes that are shown in FIG. 2 as being used to indicate information regarding masking bars (e.g., bytes 6-13) may instead be used to store any of the metadata described herein. By storing the metadata (different from the masking bar information) in a field of the AVI InfoFrame data structure, the metadata may be transmitted as part of an HDMI-standard-compliant data transmission, and may be associated with a specific frame of a video stream, and may therefore arrive at the recipient device in a frame-aligned manner.

To enable storage of non-standard metadata in the AVI InfoFrame, transmission of the AVI InfoFrame containing said metadata, and reading of said metadata from the AVI InfoFrame following receipt, bits B1 and B0 shown in Data Byte 1 of exemplary FIG. 2 can be set to 0, thereby indicating that video bar information should not be read from Data Bytes 6-13. By indicating that video bar information should not be read from data bytes 6-13, it may be ensured that the recipient device does not attempt to render video bars on the basis of metadata that is store in those fields instead.

Figure 3:
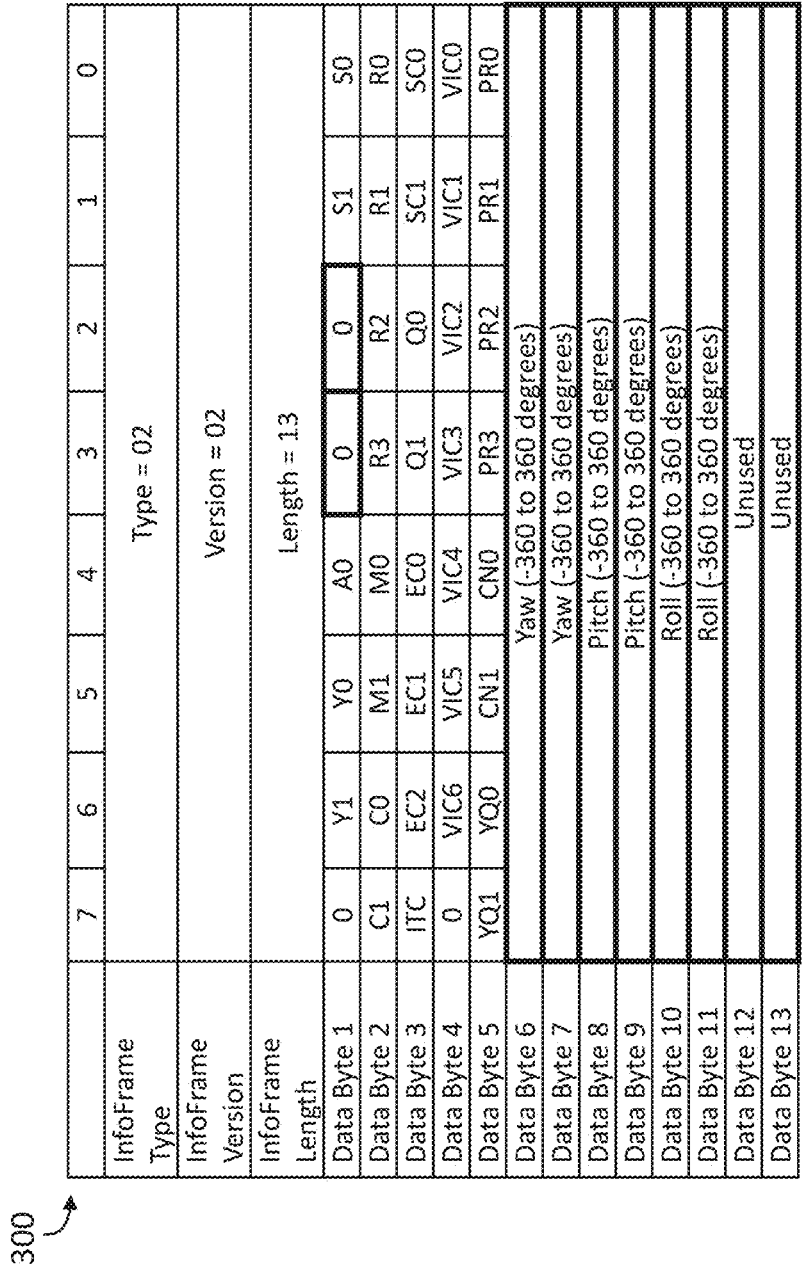
FIG. 3 depicts a data structure after modification of cells shown with a bolded frame to enable inclusion of metadata or to include metadata, in accordance with some aspects.

FIG. 3 depicts a data structure 300 after inclusion of non-standard metadata (different from the masking bar information), in accordance with some aspects. Here, as explained above, B1 and B0 (Data Byte 1, bits 3 and 2) have been set to 0, indicating that video bar information should not be read from Data Bytes 6-13. In the example shown in FIG. 3, the metadata stored in Data Bytes 6-11 (bytes 12 and 13 are unused in the example shown) indicates image sensor orientation data including yaw, pitch, and roll. In the example shown, two bytes are used for yaw data, two bytes are used for pitch data, and two bytes are used for roll data.

As indicated in this example, yaw, pitch, and roll each may each vary from −360 degrees to 360 degrees. With each being stored as a 16 bit integer, two 8-bit bytes may be used for storage of each, thereby collectively using Data Bytes 6-11 to store the three variables. To enable storage of these angular data variables at one-tenth-of-one-degree precision, a data transmission device 130 depicted in FIG. 1 may multiply raw angle data by 10 before writing it to the data structure, and data reception device 150 may correspondingly divide the value stored in the data structure by 10 to translate it back to an angular value.

Optionally, instead of image sensor orientation data (or in addition thereto), other metadata may be stored in the data structure including metadata indicating, for example, image sensor type, configuration, analog and/or digital gain, exposure duration, rotation, and/or acceleration, or metadata related to ambient conditions such as light, temperature, humidity, and/or air quality.

While FIG. 3 shows one example of transmitting non-standard metadata (e.g., sensor metadata) in a field of an AVI InfoFrame usually used for transmitting video bar information, other fields of the AVI InfoFrame could also be used to transmit non-standard metadata (e.g., sensor metadata). Furthermore, other kinds of data structures and/or other data packets that are transmitted via a data transport protocol for a video frame could be used to transmit non-standard metadata; for example, other InfoFrames, such as an audio InfoFrame, MPEG Source InfoFrame, Source Product Descriptor InfoFrame, and/or Vendor-Specific InfoFrame could be used.

Figure 4:
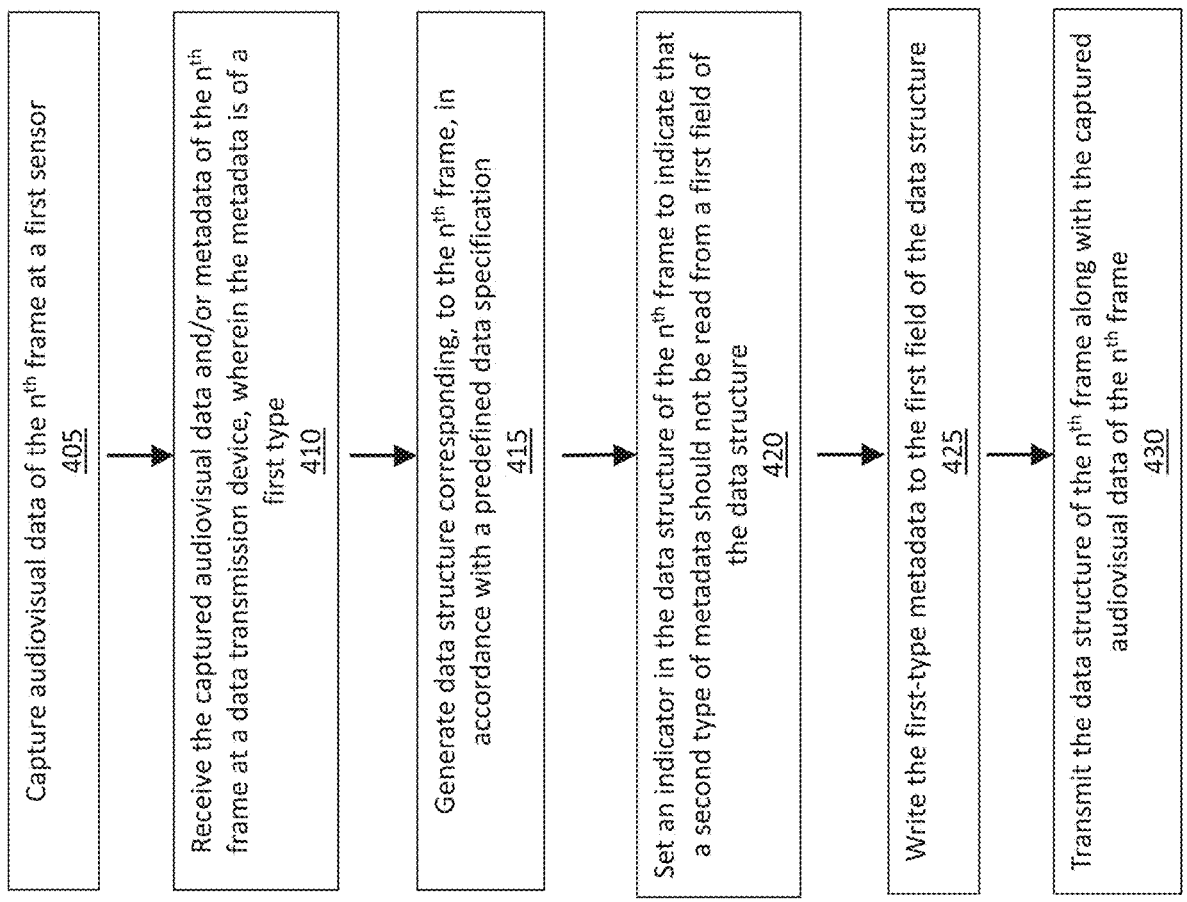
FIG. 4 depicts a flow chart representing a method for combining audiovisual data and sensor metadata into a data structure corresponding to the $n^{th}$ video frame, and transmitting that data structure, in accordance with some aspects.

FIG. 4 depicts a flow chart representing an example of a method for writing sensor metadata (or other metadata of a first metadata type) into a data structure corresponding to the $n^{th}$ video frame, and transmitting that data structure along with audiovisual data of the $n^{th}$ frame. At block 405, optionally, the audiovisual sensor 110 depicted in FIG. 1 may capture data associated with a video frame, for example one frame of a video feed of a surgical operation. Optionally, data associated with this frame is then transmitted to the data transmission device 130, along with any metadata of a first type associated with that frame.

At block 410, optionally, the captured audiovisual data and metadata of the first type associated with the particular frame are received by the data transmission device 130. The metadata of the first type may be generated by sensor 110, another sensor of the system, transmission device 130, and/or another system component (e.g., a clock circuit). The metadata of the first type may be received by data transmission device 130 at a same (or similar) sample rate as the audiovisual data is received, and/or the metadata may be received by data transmission device 130 as part of a same transmission as the audiovisual data. Metadata of the first type may include metadata indicating information about the acquisition and/or processing of the audiovisual data (e.g., rather than merely about the transport of said audiovisual data), for example including metadata from sensor 120.

At block 415, optionally, the data transmission device may then generate a data structure 140 in accordance with a predefined data specification. As explained above, this data structure may take the form of an AVI InfoFrame of the HDMI Specification, a predefined data specification. Alternately or additionally, the data structure may take the form of an audio InfoFrame, an MPEG Source InfoFrame, and/or another kind of InfoFrame.

At block 420, optionally, an indicator in the data structure may be set to indicate that a second type of metadata, distinct from the first type of metadata, should not be read from one or more data structure fields. The second type of metadata may include auxiliary data items regarding the audiovisual data or a source device for said audiovisual data, wherein this information pertains to the manner in which the audiovisual data should be transported. Said video format data information may include, for example, resolution information, colorimetry information, HDR information, information regarding full-scale versus limited range, information defining a transport standard, and/or information for transport and display. Setting the indicator to indicate that the second type of metadata should not be read from the one or more data structure fields may ensure that the system does not attempt to process the received first type of metadata as if it were the second type of metadata, which could lead to errors in rendering video or audio or could cause video transmission to fail. In addition to setting one or more indicators as explained, a system may be specifically configured such that it does read the first type of metadata from said one or more fields, wherein the reading of the first type of metadata from those one or more fields may be an operation that is not part of a data specification (e.g., the HDMI Specification) that defines the structure of the data structure. As explained above in the context of exemplary FIGS. 2 and 3, which depict the example of an AVI InfoFrame, bits B1 and B0 may serve as indicator bits which, when set to 0, indicate that audiovisual data should not be read from DataBytes 6-13.

At block 425, optionally, the first-type metadata associated with the particular frame may then be written to the data structure field(s) from which, following block 420, it is indicated that the second type of metadata should not be read. Referring again to the example of an AVI InfoFrame, first-type metadata may be written to one or more of DataBytes 6-13. As explained above in the context of exemplary FIGS. 2 and 3, the addition of image sensor orientation data including yaw, pitch, and roll may be stored using two DataBytes for each variable and involve pre-processing and post-processing to allow for sub-integer precision.

As explained above, optionally, instead of image sensor orientation data, other first-type metadata might be stored in the data structure including, for example, image sensor type, configuration, analog and/or digital gain, exposure duration, rotation, and/or acceleration, or first-type metadata related to ambient conditions such as light, temperature, humidity, and/or air quality.

At block 430, optionally, the data structure associated with a particular video frame, and now including the first-type metadata, may then be transmitted downstream for further processing, along with the captured audiovisual data. Audiovisual data and the data structure may both be sent according to the same data specification and/or the same data transport protocol. Audiovisual data may be sent at one or more first predefined temporal portions of a data transmission (e.g., a "video data island"), while the data structure may be sent at one or more second predefined temporal portions of the data transmission (e.g., an "auxiliary data island"). Optionally, the data structure and audiovisual data may be transmitted to a data reception device 150 as depicted in FIG. 1, enabling certain image processing techniques involving metadata frame alignment with audiovisual data, such as sensor alignment, image stabilization, machine learning applications, and/or conversion of audiovisual data and/or metadata to a different storage format, with the frame-aligned metadata informing each of these processing techniques. The transmission of the data structure may be carried out in compliance with one or more data transport protocols and/or standards, for example in accordance with auxiliary data transport protocols of a data standard with which the data structure complies, e.g., the HDMI standard.

Figure 5:
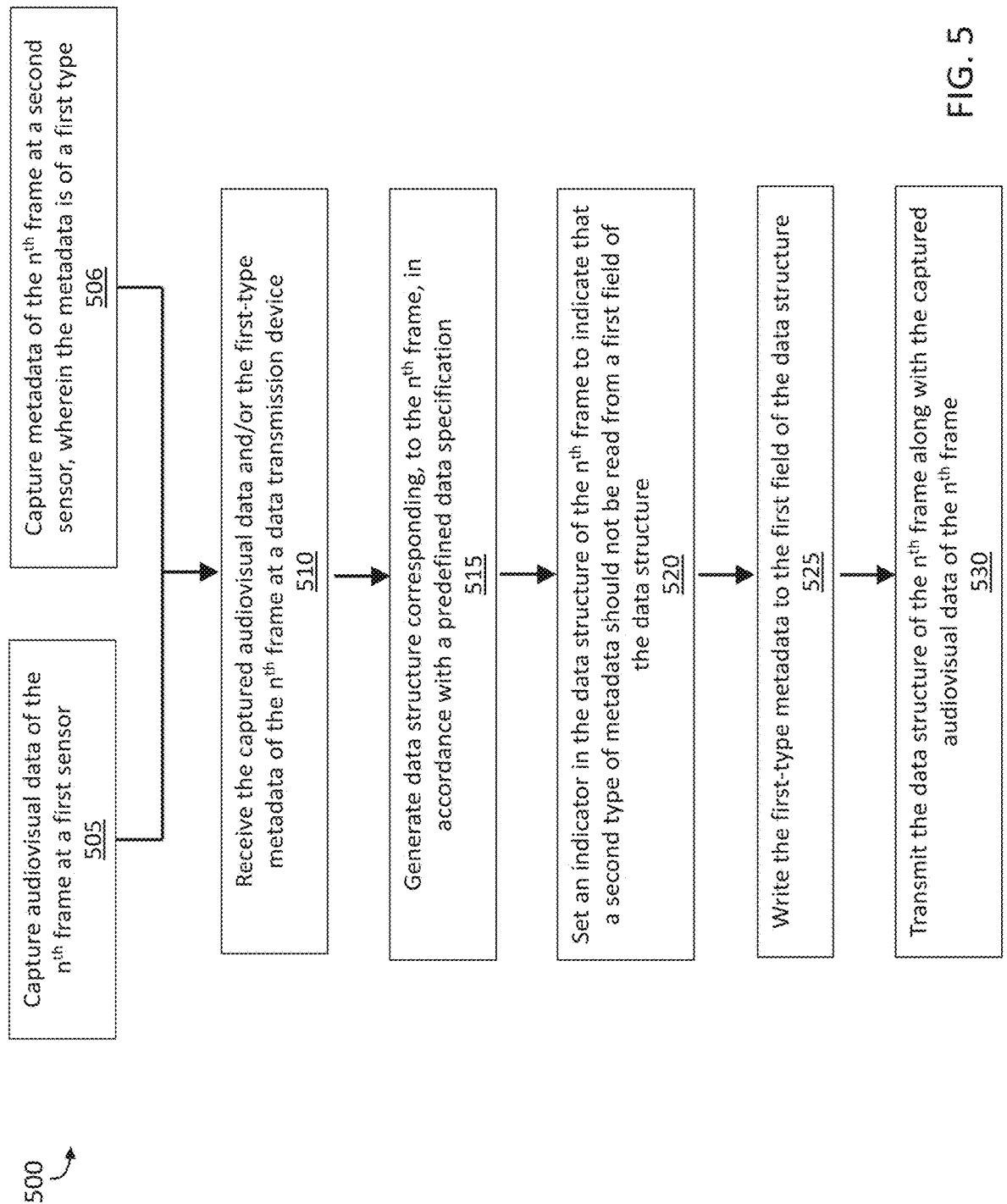
FIG. 5 depicts a flow chart representing a method for combining audiovisual data and sensor metadata from separate sensors into a data structure corresponding to the $n^{th}$ video frame, and transmitting that data structure, in accordance with some aspects.

FIG. 5 depicts a flow chart representing an example of a method for transmitting audiovisual data and sensor metadata from separate sensors, including by using a data structure corresponding to the $n^{th}$ video frame to store the sensor metadata. According to some aspects, frame-aligned metadata of a first type may be collected, for example, by any number of sensors including those also collecting audiovisual data and those collecting metadata (e.g., sensor parameter data). Optionally, the method of FIG. 5 may share one or more (or all) characteristics in common with the method of FIG. 4, wherein FIG. 5 depicts an instance in which the first-type metadata is captured by a second sensor separate from the first sensor that captures audiovisual data.

In the case of two or more sensors, for example, one collecting audiovisual data (block 505) and one collecting the first-type metadata (block 506), procedures may be used to ensure data from multiple sensors arrives at the data transmission device 130 in a frame-aligned manner, particularly given that the multiple sensors may capture data at different capture rates. A solution, for example, may involve the use of a same or similar data transfer or file transfer protocol to ensure alignment between incoming data packets corresponding to each video frame arriving from each sensor. A solution may also involve, for example, the configuration of sensor control processes to ensure one or more sensors have a sample rate the same or similar to that of a different sensor. This may involve, for example, multiple metadata sensors configured to use a sample rate similar to that of a single audiovisual sensor.

Blocks 510-530 may share any one or more (e.g., all) characteristics in common with the corresponding block from blocks 410-430, described above with reference to FIG. 4.

Figure 6:
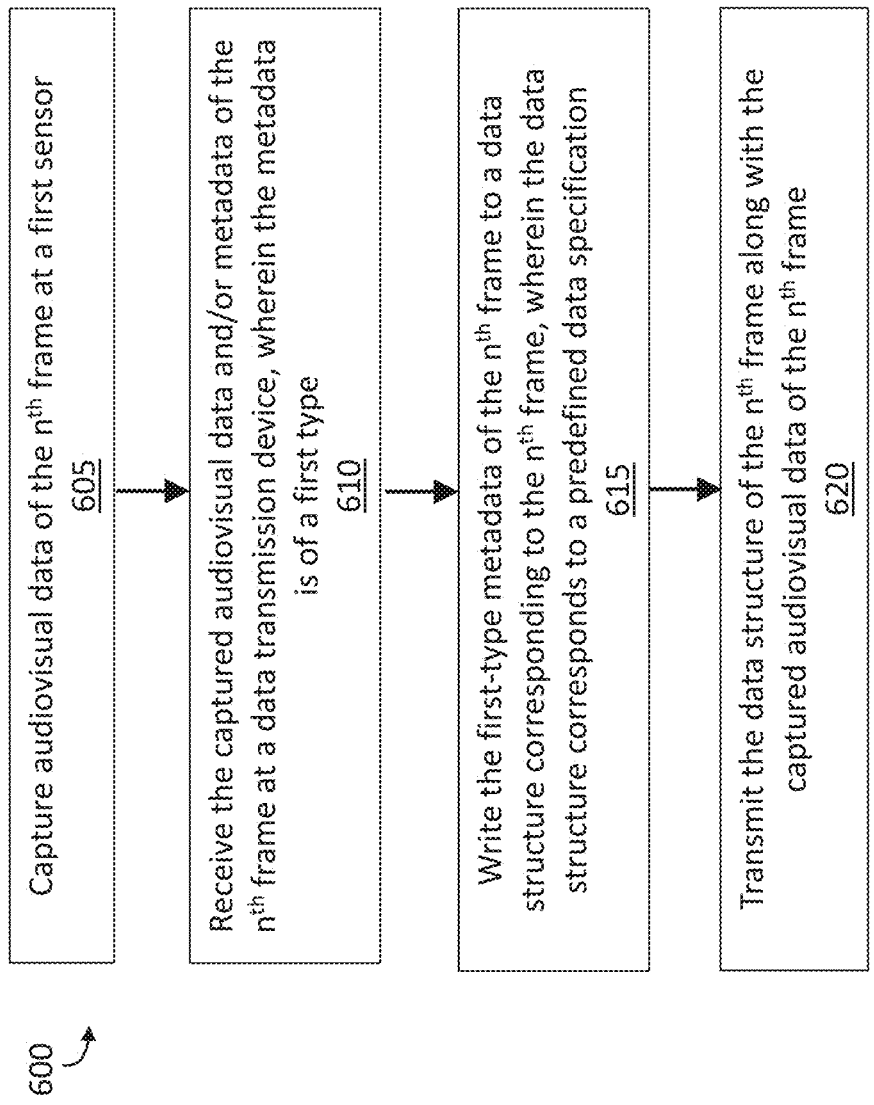
FIG. 6 depicts a flow chart representing a method for combining audiovisual data and sensor metadata into a data structure corresponding to the $n^{th}$ video frame, and transmitting that data structure, in accordance with some aspects.

FIG. 6 depicts a flow chart representing an example of a method for combining audiovisual data and/or sensor metadata into a data structure corresponding to the $n^{th}$ video frame, and transmitting that data structure. At block 605, optionally, the audiovisual sensor 110 depicted in FIG. 1 may capture data associated with a video frame, for example one frame of a live video feed of a surgical operation. Optionally, data associated with this frame is then transmitted to the data transmission device 130. Metadata associated with that frame may also be transmitted to data transmission device 130, for example at a sample rate which may be similar to the sample rate used to capture and/or transmit to device 130 the audiovisual data. The metadata may be metadata of a first type, as discussed herein, for example including metadata indicating information about acquisition and/or processing of the audiovisual data (e.g., rather than merely about the transport of said audiovisual data), for example including metadata from a sensor such as sensor 120.

At block 610, optionally, this captured audiovisual data and metadata is received by the data transmission device 130. At block 615, optionally, the data transmission device may then write the first-type metadata of the $n^{th}$ frame to a data structure corresponding to the $n^{th}$ frame, wherein the data structure corresponds to a predefined data specification. For example, the data transmission device may generate a data structure 140 that includes the first-type metadata, wherein the data structure may correspond to (e.g., may be wholly or partially complaint with) a predefined data specification, for example by wholly or partially complying with a specification for an InfoFrame data structure for the HDMI specification. At block 620, optionally, the data structure 140 associated with a particular video frame may then be transmitted downstream for further processing along with the captured audiovisual data of the particular frame. Optionally, this may involve transmission of the data structure to a data reception device 150 as depicted in FIG. 1, enabling certain image processing techniques such as sensor alignment, image stabilization, machine learning applications, and/or conversion of audiovisual data and/or metadata to a different storage format, with the associated metadata informing each of these processing techniques.

Method 600 and its steps 605-620 may share any one or more (e.g., all) characteristics in common with methods 400 and/or 500 and their corresponding steps.

Figure 7:
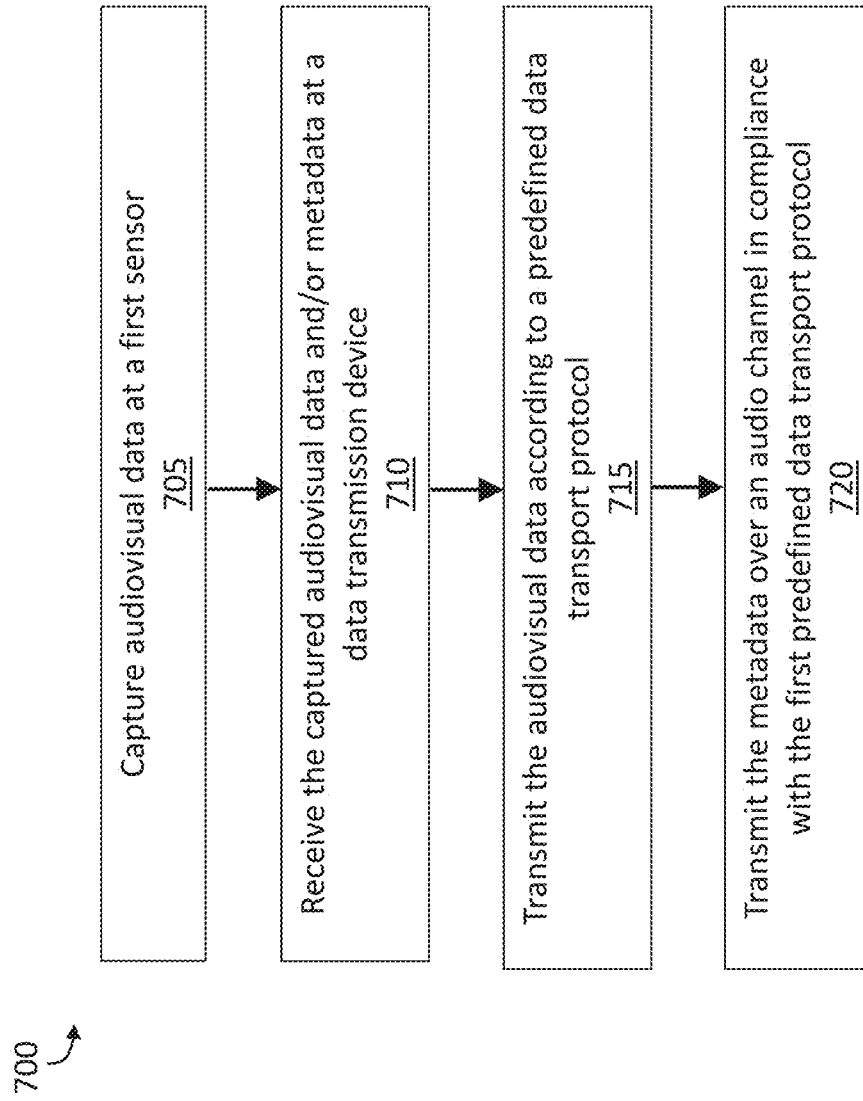
FIG. 7 depicts a flow chart representing a method for combining audiovisual data and sensor metadata into a data structure, and transmitting that data structure via an audio channel, in accordance with some aspects.

FIG. 7 depicts a flow chart representing an example of a method for transmitting metadata (e.g., sensor metadata) via an audio channel. At block 705, optionally, audiovisual sensor 110 depicted in FIG. 1 may capture audiovisual data. Optionally, this audiovisual data is then transmitted to the data transmission device 130, along with any captured metadata. At block 710, optionally, the captured audiovisual data and associated metadata are received by the data transmission device 130. Blocks 705 and 710 may share any one or more characteristics in common with data capture and data receipt steps of one or more other methods described herein.

At block 715, optionally, the data transmission device may transmit the audiovisual data according to a predefined data transport protocol, for example in compliance with the HDMI Specification.

At block 720, optionally, the metadata (which may include, for example the types of first-type metadata described above herein) may be transmitted over an audio channel according to the predefined data transport protocol, for example, in compliance with the HDMI Specification. Optionally, block 720 may entail encoding of the metadata (e.g., application of a byte encoding schema) before writing it to individual bytes to ensure compatibility with audio signal processing. Optionally, block 720 may entail conversion of the metadata to an analog signal in anticipation of conveyance over an audio channel using a modem. For example, data could be processed via a UART device, transmitted to an analog modem chip, and then transmitted via an audio input channel of an HDMI transmitter.

Method 600 and its steps 605-620 may share any one or more (e.g., all) characteristics in common with methods 400, 500, and/or 600 and their corresponding steps.

Figure 8A:
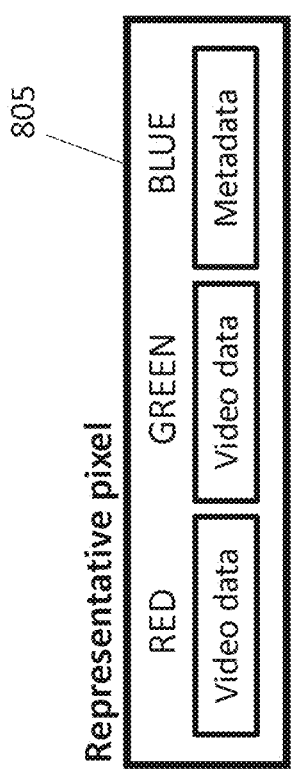
FIG. 8A depicts pixel data comprising three color channels, in an exemplary configuration used to transmit video data and metadata, in accordance with some aspects.
Figure 8C:
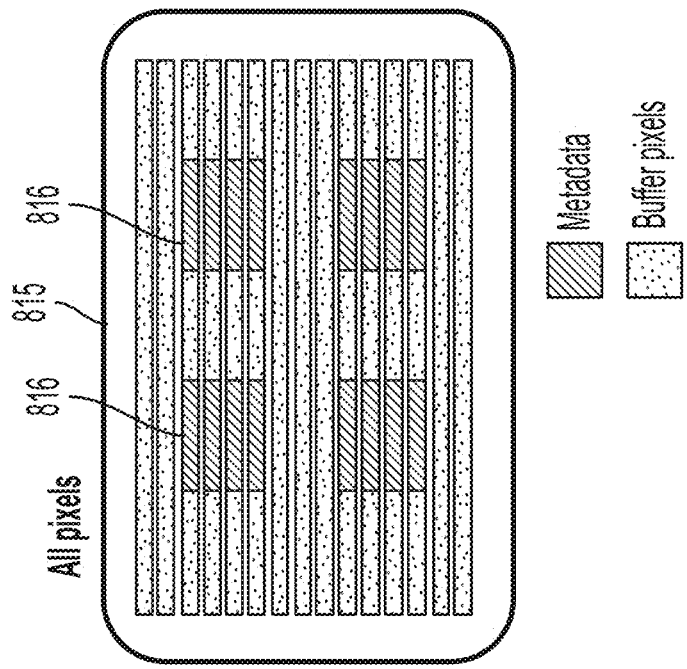
FIG. 8C depicts pixels of a video frame in an exemplary configuration, with metadata transmitted in a plurality of spatial subsets of the pixels, in accordance with some aspects.
Figure 8B:
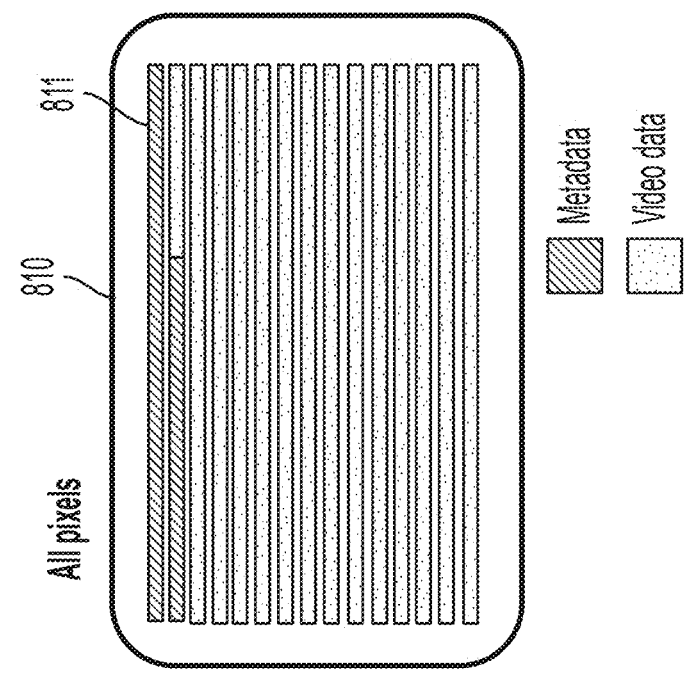
FIG. 8B depicts pixels of a video frame in an exemplary configuration, with metadata transmitted in fields corresponding to a single spatial subset of the pixels, in accordance with some aspects.

FIGS. 8A-C depict examples of one or more methods which may be used to transmit video data and metadata by transmitting said metadata in data fields corresponding to some or all of the portions of color channels of a predefined data specification (e.g., the HDMI Specification). As shown, metadata (e.g., sensor metadata and/or other first-type metadata as described herein above) may be transmitted by encoding the metadata into portions of a video data transmission that would normally (e.g., according to the data transport protocol) be used to transmit video data such as color information for one or more pixels. FIG. 8A depicts a single pixel representing part of three color channels, in an exemplary configuration used to transmit video data and/or metadata. In particular, one or more of the color channels may be used to transmit audiovisual data, while one or more of the color channels may be used to transmit frame-aligned metadata. For example, the red and green color channels may be used to transmit video data, while the blue color channel may be used to transmit metadata. Optionally, luminance data (usable for registration) may be transmitted by one color channel (e.g., the red color channel), fluorescence data (e.g., normalized fluorescence data, usable for quantification) may be transmitted by another color channel (e.g., the green color channel), and metadata (e.g., sensor metadata and/or other first-type metadata) may be transmitted by yet another color channel (e.g., the blue color channel). This arrangement is shown, by way of example, in FIG. 8A, for data for a single representative pixel of a frame. Optionally, this method may be applied to any suitable number of pixels per frame, for example by being applied from a single pixel up to the entirety of a frame for any one or more color channels, according to the relative amounts of video data and metadata to be transmitted.

Packing metadata into a single 8-bit color channel in a 1920×1080 image may provide 2,073,600 bytes of metadata information per frame. While certain examples herein are provided with respect to 8-bit pixel values, it should be understood that other suitable bit-depths could be used.

Optionally, metadata may be stored for transmission via a color channel using 4-bit unsigned integers, where a high-byte data may be stored in a field for a first pixel, first byte data may be stored in a field for a second pixel, second byte data may be stored in a field for a third pixel, and low-byte data may be stored in a field for a fourth pixel. Optionally, metadata may be formatted, for transmission via a color channel, in key-length-value format. For example, key-high data may be stored in a field for a fifth pixel, key-low data may be stored in a field for a sixth pixel, length-high data may be stored in a field for a seventh pixel, length-low data may be stored in a field for an eighth pixel, and value data may be stored in fields respectively for a ninth pixel through an x-th pixel.

FIGS. 8B and 8C depict pixels of a video frame 810 and 815 respectively, with metadata transmitted in only a subset (e.g., defining one or more spatial portions) of the pixels of one or more color channels, in accordance with some aspects. Transmitting metadata instead of pixel color data for one or more pixels of a frame may be carried out for one color channel, two color channels, or all color channels.

In the example of FIG. 8B, metadata is transmitted in a portion of a transmitted data stream that would otherwise be used for conveying image information for a portion of the frame corresponding to a portion of the top two lines of the frame. Optionally, metadata is transmitted in fewer than all of the color channels corresponding to the pixel lines 811 of the video frame 810, such that some image data may be simultaneously transmitted by the other color channel(s). As shown in FIG. 8B, image data may be transmitted in one or more color channels for portions of the frame that are not used for transmission of metadata (e.g., those portions of the frame other than lines 811).

Optionally, metadata transmitted in all three color channels of the first x lines of a frame may be formatted in key-length-value format, such that a first byte (e.g., red channel) of the first pixel may represent high byte data, a second byte (e.g., green channel) of the first pixel may represent low-byte data, a third byte (e.g., blue channel) of the first pixel may represent key-high data, a first byte (e.g., red channel) of the second pixel may represent key-low data, a second byte (e.g., blue channel) of the second pixel may represent length-high data, a third byte (e.g., blue channel) of the second pixel may represent length-low data, and a suitable number of subsequent bytes from the third pixel onward may represent value data that encodes the metadata to be encoded. After the fields encoding the metadata, the remaining fields may encode audiovisual data (e.g., video data) for the remainder of the frame. Optionally, the high-byte data and low-byte data may represent the number of fields encoded in the frame.

The application exemplified by FIG. 8B may be advantageous if, for example, the top pixel lines of a video frame would not be expected to convey important visual information in standard use cases.

In the example of FIG. 8C, metadata is transmitted within one or more of the red, green, and blue color channels in pixel groupings 816 of the video frame 815. Pixel groupings 816 may be spatially distributed throughout frame 815 and may be spaced apart from one another by buffer pixels that do not encode metadata. Pixel groupings 816 may be N by N pixels in size (or may be M by N pixels in size, which may be useful in systems such as a wireless audiovisual transmission system that decimates video frames only in one dimension). Optionally, video data may be transmitted in other portions of frame 815. Optionally, no video data may be transmitted (at least via the depicted color channel(s)) in any portion of frame 815. Optionally, different metadata may be encoded into the different pixel groupings 816; optionally, the same metadata may be duplicated across one or more of the depicted pixel groupings 816, for example to improve data redundancy and reduce the risk of data corruption. Optionally, all pixels within a pixel group may be assigned the same value from 0 to $2^k-1$, where k is the number of bits encoded by a pixel group; for k=8, each pixel group would represent a whole byte.

Optionally, up to all values within one or more groupings are identical, thereby improving the reliability of metadata recovery. Encoding bytes in pixel groups instead of just in single pixels may make data recovery more robust to chroma subsampling as well as to spatial processing such as smoothing or compression. Optionally, reducing the number of allowed pixel group values may make data recovery more robust to color space conversion and/or compression. Lower values of k may lead to the most robust data recovery. An extreme example is k=1 where each pixel group encodes only a single bit.

Optionally, instead of transmitting video data in some or all portions of color channels without metadata transmission, buffer pixels between metadata pixel groupings 816 may be used to increase robustness of metadata transmission. Optionally, buffer pixels may be set to values that may be approximately an average of the values of nearby pixel groupings as depicted in FIG. 8C, thereby reducing sharp transitions in pixel values and increasing the likelihood of proper reconstruction.

The application exemplified by FIG. 8C may be advantageous in the case of a typically unused video output, e.g., a video frame with one or more color channels that would otherwise be unused, allowing metadata to be transmitted over some or all unused color channels. Optionally, in the case of all three color channels of a video frame being available for metadata transmission, different types of metadata including sensor parameters may be transmitted in each color channel. For example, parameters relating to the lighting conditions might be transmitted in a first color channel, inertial measurement unit data might be transmitted in a second color channel, while image sensor settings such as exposure and analog and/or digital gain might be transmitted in a third color channel.

The application exemplified by FIG. 8C may also be advantageous if, for example, a predefined data specification is associated with a frame rate higher than that displayed to the user, e.g., resulting in unused frames interspersed among frames used for video data. Optionally, metadata may be transmitted within unused frames by utilizing the pixel groupings 816 and buffer pixels explained above and depicted in FIG. 8C. According to various aspects, transmitting metadata to unused frames may involve the use of additional processing techniques accomplished by the data transmission device 130 and/or the data reception device 150.

In the example of encoding metadata into pixel groupings where k=2, $2^k=2^2$ may yield 4 bins, meaning that 256/4 yields 64-bit wide bins for each pixel group encoding. (It should be noted that the number 256 assumes 8-bit color depth; if another bit-depth were used, then the number would be different.) Accordingly, a collection of four pixel groups encoding k=2 bits each may comprise one byte, and a center value for each bin may thus be encoded in pixel groups. When metadata for the bins is read, any value falling within the bin (not just the target center value) may be understood to encode the same information. This may make the encoding process robust to errors if, for example, distortions of bit values are introduced in transmission.

In the example of encoding metadata into pixel groupings where N=5, a 2-pixel wide buffer is used between pixel groupings, and k=2 (two bit per pixel group encoding) is used, the resulting metadata space allotted for a single 1920×1080 frame would be 10,549 bytes. This amount of data may be significantly less data than single-pixel encoding but much more robust to unknown video transport, color space conversion, scaling, and compression.

Optionally, Reed-Solomon encoding may be applied to data encoded in pixel groupings to further increase data robustness.

The first lines of pixels or pixel groups can be used to determine a video transport's data accuracy by transmitting a known string of bytes. The known string may, for example, be pixel value 0 to 255, exercising the full range of video intensities. This may serve as a test to determine if the video transport channel is robust enough to recover the metadata on the video sink. For example, a CCU may generate and encode metadata, which may go through HDMI to an IP stream video converter then back again to HDMI before it reaches a receiving device (e.g., a HUB). If details of the converters are unknown, then testing with a known string of bytes may allow the system to determine if the metadata is preserved or not. If metadata is not preserved, then, optionally, the system may change one or more settings, for example by changing from a single byte of metadata per pixel (higher bandwidth) to a more robust pixel group method (lower bandwidth, higher robustness).

Figure 9:
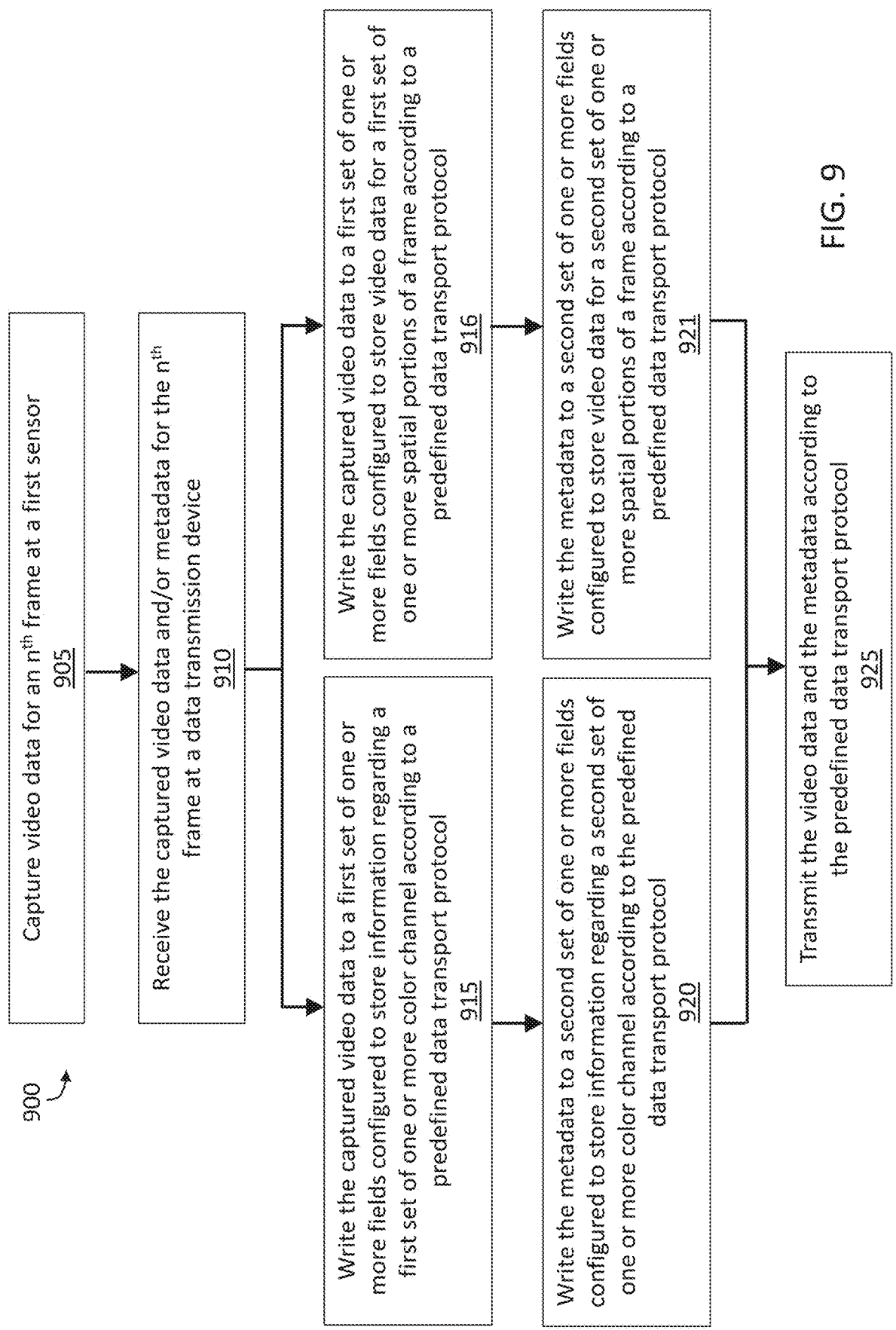
FIG. 9 depicts a flow chart representing a method for transmitting audiovisual data and metadata via one or more color channels, in accordance with some aspects.

FIG. 9 depicts a flow chart representing an example of a method for transmitting audiovisual data and metadata via one or more color channels. At block 905, optionally, the system captures video data for an $n^{th}$ frame at a first sensor. For example, audiovisual sensor 110 depicted in FIG. 1 may capture video data. Optionally, this video data is transmitted to data transmission device 130. Associated metadata captured for that frame (e.g., sensor metadata, first-type metadata, and/or second-type metadata) may also be transferred to data transmission device 130, for example at a sample rate which may be similar to the sample rate used to capture the video data. At block 910, optionally, the captured video data and metadata is received at a data transmission device, for example data transmission device 130. The capturing and receipt steps at blocks 905 and 910 may share any one or more characteristics in common with corresponding steps described with respect to one or more other flowcharts herein.

As explained above, optionally, one or more methods may be used to transmit video data and metadata in some or all of the portions of some or all available color channels according to a predefined data transport protocol (e.g., the HDMI standard). In FIG. 9, a portion of the method including blocks 915 and 920 is shown, and a portion of the method including blocks 916 and 921 is shown. One or both portions of the method may be applied. Optionally, one or more characteristics of both portions of the methods may be shared in common and/or or combined with one another.

In the method portion shown by blocks 915 and 920, video data transmission and metadata transmission may be handled, respectively, by different available color channels. At block 915, for example, the data transmission device may write the captured video data to one or more data fields associated with a first set of one or more color channels according to the predefined data transport protocol. Referring again to exemplary FIG. 8A, optionally, if only red and green color channels were to be used for video data in a surgical imaging application, block 915 may involve transmitting video data over only red and green color channels. At block 920, optionally, metadata may be written to one or more data fields associated with a second set of one or more color channels according to the predefined data specification. Following the above example of FIG. 8A, if red and green color channels were to be used for video data, block 920 may involve storing metadata in the fields for transmission of video data for a blue color channel.

In the method portion shown by blocks 916 and 921, video data and/or metadata transmission may be transmitted by data fields corresponding to different spatial portions of a frame (e.g., different pixels, for example arranged into lines of pixels and/or spatial pixel patches). At block 916, for example, the data transmission device may write the captured video data to a first set of one or more fields configured to store video data for a first set of one or more spatial portions of a frame, according to a predefined data transport protocol. Referring again to exemplary FIG. 8B, optionally, video data may be written to pixel lines that are intended for video data display, e.g. the majority of pixel lines displayed in FIG. 8B. At block 921, optionally, metadata may be written to a second set of one or more fields configured to store video data for a second set of one or more spatial portions of the frame, according to a predefined data transport protocol. The second set of one or more spatial portions may be different spatial portions (in whole or in part) of the frame from those that were used for video data at block 916. Following the above example of FIG. 8B, optionally, metadata may be written to pixel lines that are not expected to be critically important to the displayed video, e.g. the top pixel lines 811 displayed in FIG. 8B. Alternately or additionally, as in the example of FIG. 8C, metadata may be written to one or more color-channel fields for pixel patches (e.g., 816) that may be distributed throughout the frame.

At block 925, the system may transmit the video data and the metadata according to the predefined data transport protocol, including by transmitting the data as written to the various color-channel fields as described above. As explained above, optionally, this may involve transmission of the data to a data reception device, such as data reception device 150, which in turn allows image processing using the transmitted audiovisual data and the transmitted metadata.

Figure 10:
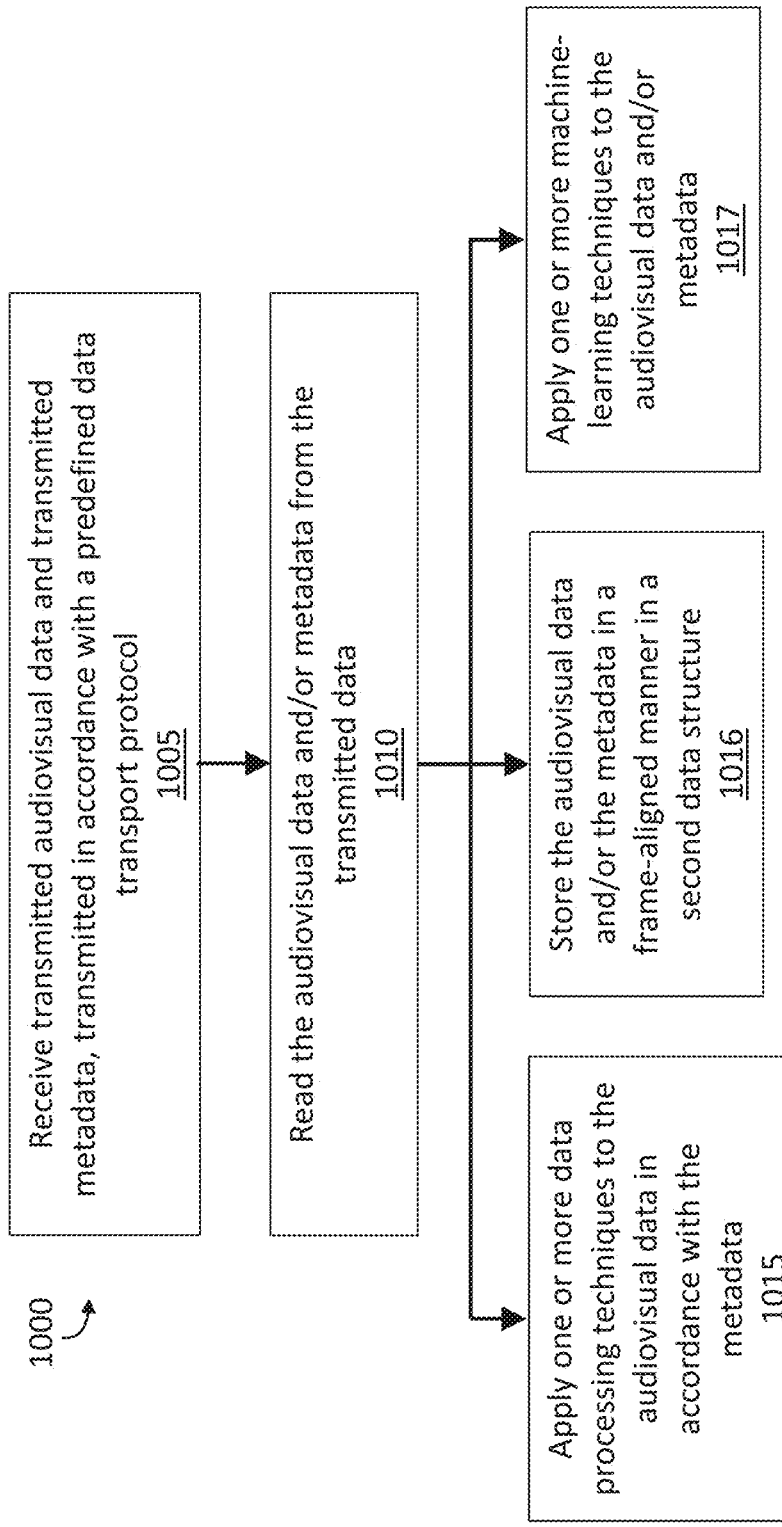
FIG. 10 depicts a flow chart representing a method of processing the transmitted data structure, in accordance with some aspects.

FIG. 10 depicts an example of a flow chart representing a method of processing the transmitted data structure. The method shown in FIG. 10 may be performed in combination with, e.g., by the same system, as any one or more of the data transmission methods described herein. As explained above, following processing by data transmission device 130 depicted in FIG. 1, audiovisual data for a given frame and metadata for the given frame (e.g., first-type metadata as described above) may both be transmitted in accordance with a predefined data transport protocol (e.g., the HDMI Specification). The data, which may include a data structure that is wholly or partially compliant with a predefined data specification (which may, e.g., be an InfoFrame data structure), may be received by data reception device 150 and may optionally be subject to data processing based on the audiovisual data and based on the metadata. Following transmission of data by the transmission device 130 as explained above, at block 1005, optionally, the data may be received by a data reception device, such as data reception device 150 depicted in FIG. 1.

At block 1010, optionally, the audiovisual data and/or metadata is read from the transmitted data. In the example of first-type metadata being transmitted via a data structure (e.g., an InfoFrame) that usually transmits second-type metadata, the system may read the first-type metadata from the data structure while not attempting to read second-type metadata from one or more fields of the data structure that would, according to a predefined data specification and/or a predefined data transport protocol, store second-type metadata. In the example of metadata being transmitted via a video channel (e.g., using certain spatial portions of a frame and/or certain color channels of the video channel), the system may read the metadata from the video-channel transmission. After reading the audiovisual data and the metadata, one or more processing techniques (e.g., image processing techniques) may optionally be applied to the extracted and frame-aligned audiovisual data and/or metadata.

At block 1015, optionally, one or more data processing techniques may be applied to the audiovisual data in accordance with the frame-aligned metadata. As explained above, these may include one or more of surgical image processing techniques such as sensor alignment or image stabilization. In the case of alignment or stabilization of, for example, audiovisual sensor 110 and/or the secondary sensor 120, image processing results may be fed back to the sensors and/or peripheral control devices connected to each thereby enabling the alignment or stabilization of each. Optionally, any one or more sensor configurations, device configurations, and/or system configurations may be set and/or modified in accordance with image processing results.

At block 1016, optionally, the audiovisual data and/or metadata may be converted to a different storage format while maintaining frame alignment of the metadata with the audiovisual data. This may involve, for example, storing audiovisual data and/or metadata within fields of recorded video containers that allow writing of user data including, for example, MPEG.

At block 1017, optionally, machine learning and/or other post-processing techniques may be applied to the audiovisual data and/or metadata. These applications may involve analyzing one or more parameters, for one or more video frames, pertaining to image capture such as image sensor type, configuration, analog and/or digital gain, exposure duration, rotation, and/or acceleration, and/or metadata related to ambient conditions such as light, temperature, humidity, and/or air quality.

Optionally, metadata (e.g., any metadata described herein) for a first frame of a video feed may be transmitted in the place of data that would, according to a predefined data transport protocol, normally be used to transmit audiovisual data for a second frame of the video feed. For example, when a standard for transmission of frames for audiovisual data supports transmission at a higher framerate than is to be used for a particular application/use-case, data fields for "unused" frames may be used to transmit metadata for one or more other frames in a video feed, for example for an adjacent frame. For example, if the HDMI standard supports a higher frame rate than is to be used for a surgical video application, the audiovisual data may be transmitted in data for a first frame and metadata for the first frame may be transmitted in data that would otherwise be used for a second frame in the HDMI video feed, where the second frame is not used for audiovisual data in the surgical video application. Upon receipt of the data stream, a data receipt device may perform frame alignment of metadata to either a previous frame or to a next frame.

Optionally, metadata may be transmitted during any "blanking period"—that is, any period outside of a data island—of a predefined data transport protocol. Metadata may be transmitted in this manner whether or not it is embedded into a predefined data structure such as an InfoFrame.

Optionally, the transmitted frame-aligned audiovisual data and metadata may be used, alone or in combination with data generated by post-processing of said frame-aligned audiovisual data and metadata, to generate one or more alerts/notifications, create one or more visualizations, and/or trigger one or more automated system actions (e.g., in accordance with whether the data satisfies one or more predefined and/or dynamically-determined criteria). Optionally, one or more automated system actions may include enabling, disabling, operating, and/or configuring one or more medical devices and/or surgical devices.

Figure 11:
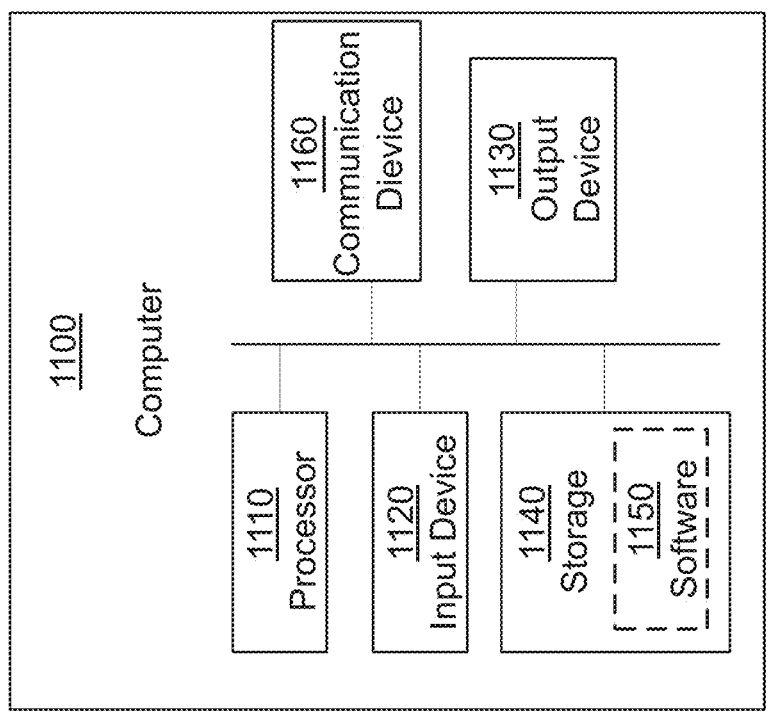
FIG. 11 depicts a computer, in accordance with some aspects.

FIG. 11 depicts an example of a computer. Computer 1100 can be a component of a system for medical image capture, display, manipulation, annotation, and/or analysis, such as system 100 and/or any of its subcomponents described above with respect to FIG. 1. Computer 1100 may be configured to execute a method for transmission of image metadata, such as all or part of any one or more of the methods described herein.

Computer 1100 can be a host computer connected to a network. Computer 1100 can be a client computer or a server. As shown in FIG. 11, computer 1100 can be any suitable type of microprocessor-based device, such as a personal computer; workstation; server; or handheld computing device, such as a phone or tablet. The computer can include, for example, one or more of processor 1110, input device 1120, output device 1130, storage 1140, and communication device 1160.

Input device 1120 can be any suitable device that provides input, such as a touch screen or monitor, keyboard, mouse, or voice-recognition device. Output device 1130 can be any suitable device that provides output, such as a touch screen, monitor, printer, disk drive, or speaker.

Storage 1140 can be any suitable device that provides storage, such as an electrical, magnetic, or optical memory, including a RAM, cache, hard drive, CD-ROM drive, tape drive, or removable storage disk. Communication device 1160 can include any suitable device capable of transmitting and receiving signals over a network, such as a network interface chip or card. The components of the computer can be connected in any suitable manner, such as via a physical bus or wirelessly. Storage 1140 can be a non-transitory computer-readable storage medium comprising one or more programs, which, when executed by one or more processors, such as processor 1110, cause the one or more processors to execute all or part of any one or more of the methods described herein.

Software 1150, which can be stored in storage 1140 and executed by processor 1110, can include, for example, the programming that embodies the functionality of the present disclosure (e.g., as embodied in the systems, computers, servers, and/or devices as described above). Software 1150 can be implemented and executed on a combination of servers such as application servers and database servers.

Software 1150 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1100 can implement any operating system suitable for operating on the network. Software 1150 can be written in any suitable programming language, such as C, C++, Java, or Python. In various aspects, application software embodying the functionality of the present disclosure can be deployed in different configurations, such as in a client/server arrangement or through a Web browser as a Web-based application or Web service, for example.

Use of the systems and methods disclosed herein enable these metadata parameters to be associated in an efficient and reliable manner with each frame of audiovisual data, which in turn is important to various surgical image processing techniques as explained above.

The foregoing description, for the purpose of explanation, has been described with reference to specific aspects. However, the illustrative discussions above are not intended to be exhaustive or to limit the invention to the precise forms disclosed. Many modifications and variations are possible in view of the above teachings. The aspects were chosen and described in order to best explain the principles of the techniques and their practical applications. Others skilled in the art are thereby enabled to best utilize the techniques and various aspects with various modifications as are suited to the particular use contemplated. For the purpose of clarity and a concise description, features are described herein as part of the same or separate aspects; however, it will be appreciated that the scope of the disclosure includes aspects having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference. For the purpose of clarity and a concise description, features are described herein as part of the same or separate aspects; however, it will be appreciated that the scope of the disclosure includes aspects having combinations of all or some of the features described.

The invention claimed is:

1. A system for transmission of imaging metadata, comprising:
   a first sensor configured to capture audiovisual data;
   a data transmission device comprising one or more processors configured to cause the data transmission device to:
   receive the captured audiovisual data from the first sensor;
   receive first metadata, wherein the first metadata is metadata of a first type relating to one or both of acquisition and processing of the audiovisual data;
   generate a data structure corresponding to a first frame of a video feed, wherein the data structure is generated in accordance with a predefined data specification, wherein generating the data structure comprises:
   setting an indicator in the data structure to indicate that a second type of metadata relating to video format should not be read from a first field in the data structure, wherein the indicator comprises a bit in the data structure that indicates, according to an audiovisual data transport protocol, whether the first field should be read for video format data; and
   writing the first metadata to the first field in the data structure; and
   transmit the data structure along with the captured audiovisual data.

2. The system of claim 1, wherein the first metadata comprises information characterizing one or more of: an orientation of a component of the system, an acceleration of a component of the system, a rotation of a component of the system, a gain of the first sensor, a shutter characteristic of a component of the system, and an environmental characteristic of an environment in which the system is disposed.

3. The system of claim 1, wherein the data structure comprises an InfoFrame data structure defined by the predefined data specification, the InfoFrame data structure including the indicator and the first field.

4. The system of claim 1, wherein setting the indicator comprises setting a predefined bit to a predetermined value.

5. The system of claim 1, wherein the first field is configured, according to the predefined data specification, to store second type of metadata when the indicator is set to indicate that the second type of metadata should be read from the first field.

6. The system of claim 1, wherein the first field is configured, according to the predefined data specification, to store one or more of pixel information and line information when the indicator is set to indicate that the second type of metadata should be read from the first field.

7. The system of claim 1, wherein the first field is configured, according to the predefined data specification, to store bar location information when the indicator is set to indicate that the second type of metadata should be read from the first field.

8. The system of claim 1, comprising:
a second sensor configured to capture the first metadata before the system writes the first metadata to the data structure;
wherein the one or more processors are configured to cause the data transmission device to receive the first metadata from the second sensor before writing the first metadata to the data structure.

9. The system of claim 8, wherein:
the second sensor comprises an orientation sensor; and
the first metadata comprises orientation data representing an orientation of the first sensor at a time at which the first sensor captured the audiovisual data.

10. The system of claim 8, wherein:
the second sensor comprises an inertial motion sensor; and
the first metadata comprises inertial motion data representing an inertial motion characteristic of the first sensor at a time at which the first sensor captured the audiovisual data.

11. The system of claim 8, wherein the first sensor and the second sensor are each configured to capture data at a same capture rate.

12. The system of claim 8, wherein the first sensor and the second sensor are each configured to transmit captured data to the data transmission device in accordance with a same data transport protocol.

13. The system of claim 8, wherein:
the first sensor and the second sensor are configured to capture data at different capture rates; and
the one or more processors are configured to cause the data transmission device to sample data from the first sensor and the second sensor at a same sample rate.

14. The system of claim 1, wherein the system comprises a data reception device comprising a second set of one or more processors configured to cause the data reception device to:
receive the transmitted data structure;
receive the transmitted audiovisual data;
read, from the transmitted data structure, the first metadata that was written to the first field of the data structure; and
apply one or more data processing techniques to the transmitted audiovisual data, wherein the one or more data processing techniques are applied in accordance with the first metadata read from the first field of the transmitted data structure.

15. The system of claim 1, wherein the system comprises a data reception device comprising a second set of one or more processors configured to cause the data reception device to:
receive the transmitted data structure;
receive the transmitted audiovisual data;
read, from the transmitted data structure, the first metadata that was written to the first field of the data structure; and
store the audiovisual data and the first metadata in a frame-aligned manner in a second data structure, distinct from the first data structure.

16. The system of claim 1, wherein the system comprises a data reception device comprising a second set of one or more processors configured to cause the data reception device to:
receive the transmitted data structure;
receive the transmitted audiovisual data;
read, from the transmitted data structure, the first metadata that was written to the first field of the data structure; and
apply one or more machine-learning techniques to the audiovisual data and the metadata read from the first field of the transmitted data structure.

17. A method for transmission of imaging metadata, the method performed by a system comprising a first sensor configured to capture audiovisual data and a data transmission device comprising one or more processors, the method comprising:
receiving the captured audiovisual data from the first sensor;
receiving first metadata, wherein the first metadata is metadata of a first type relating to one or both of acquisition and processing of the audiovisual data;
generating a data structure corresponding to a first frame of a video feed, wherein the data structure is generated in accordance with a predefined data specification, wherein generating the data structure comprises:
setting an indicator in the data structure to indicate that a second type of metadata relating to video format should not be read from a first field in the data structure, wherein the indicator comprises a bit in the data structure that indicates, according to an audiovisual data transport protocol, whether the first field should be read for video format data; and
writing the first metadata to the first field in the data structure; and
transmitting the data structure along with the captured audiovisual data.

18. A non-transitory computer-readable storage medium storing instructions for transmission of imaging metadata, the instructions configured to be executed by one or more processors of a system comprising a first sensor configured to capture audiovisual data and a data transmission device, wherein execution of the instructions by the one or more processors causes the data transmission device to:
receive the captured audiovisual data from the first sensor;
receive first metadata, wherein the first metadata is metadata of a first type relating to one or both of acquisition and processing of the audiovisual data;
generate a data structure corresponding to a first frame of a video feed, wherein the data structure is generated in accordance with a predefined data specification, wherein generating the data structure comprises:
setting an indicator in the data structure to indicate that a second type of metadata relating to video format should not be read from a first field in the data structure, wherein the indicator comprises a bit in the data structure that indicates, according to an audiovisual data transport protocol, whether the first field should be read for video format data; and
writing the first metadata to the first field in the data structure; and transmit the data structure along with the captured audiovisual data.

\* \* \* \* \*